United States Patent
Isono et al.

(10) Patent No.: US 11,476,504 B2
(45) Date of Patent: Oct. 18, 2022

(54) ALL-SOLID-STATE BATTERY

(71) Applicant: TOYOTA JIDOSHA KABUSHIKI KAISHA, Toyota (JP)

(72) Inventors: Motoshi Isono, Toyota (JP); Takashi Takemoto, Toyota (JP); Kazuo Yaso, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 316 days.

(21) Appl. No.: 16/781,297

(22) Filed: Feb. 4, 2020

(65) Prior Publication Data

US 2020/0259216 A1 Aug. 13, 2020

(30) Foreign Application Priority Data

Feb. 12, 2019 (JP) .............................. JP2019-022562

(51) Int. Cl.
*H01M 10/0585* (2010.01)
*H01M 10/0525* (2010.01)

(52) U.S. Cl.
CPC ... *H01M 10/0585* (2013.01); *H01M 10/0525* (2013.01)

(58) Field of Classification Search
CPC ........... H01M 10/045; H01M 10/0454; H01M 10/0459
See application file for complete search history.

(56) References Cited

U.S. PATENT DOCUMENTS

| | | | |
|---|---|---|---|
| 2017/0098862 A1* | 4/2017 | Komori | H01M 10/0525 |
| 2018/0076495 A9* | 3/2018 | Park | H01M 12/02 |
| 2018/0226681 A1* | 8/2018 | Hasegawa | H01M 10/052 |
| 2019/0372159 A1* | 12/2019 | Suzuki | H01M 10/0525 |

FOREIGN PATENT DOCUMENTS

| | | | |
|---|---|---|---|
| JP | 2008097940 A | * | 4/2008 |
| JP | 2013-243004 A | | 12/2013 |
| JP | 2015-069843 A | | 4/2015 |
| JP | 2015103433 A | | 6/2015 |

OTHER PUBLICATIONS

Machine translation of JP2008-097940A (Year: 2008).*

* cited by examiner

*Primary Examiner* — Ryan S Cannon
(74) *Attorney, Agent, or Firm* — Dickinson Wright, PLLC (57) ABSTRACT

Provided is an all-solid-state battery which is configured to suppress an increase in the resistance of the all-solid-state battery and which is configured to suppress the peeling-off of the solid electrolyte layer. Disclosed is an all-solid-state battery comprising: a cathode comprising a cathode layer, an anode comprising an anode layer, and a solid electrolyte layer disposed between the cathode layer and the anode layer, wherein a width of the cathode layer is smaller than a width of the anode layer and a width of the solid electrolyte layer; wherein the solid electrolyte layer comprises a non-facing portion where the solid electrolyte layer does not face the cathode layer and a facing portion where the solid electrolyte layer faces the cathode layer; and wherein a binder content of the non-facing portion is larger than a binder content of the facing portion.

1 Claim, 1 Drawing Sheet

ALL-SOLID-STATE BATTERY

TECHNICAL FIELD

The disclosure relates to an all-solid-state battery.

BACKGROUND

In recent years, with the rapid spread of IT and communication devices such as personal computers, camcorders and cellular phones, great importance has been attached to the development of batteries that is usable as the power source of such devices. In the automobile industry, etc., high-power and high-capacity batteries for electric vehicles and hybrid vehicles are under development.

Of all-solid-state batteries, an all-solid-state lithium ion battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent.

Patent Literature 1 discloses an all-solid battery manufacturing method in which, in a baking step, a binder of a solid electrolytic layer is decomposed completely, and carbon or carbide, originating from the binder, is left in electrode layers, thereby increasing the conductivity of the electrode layers and, therefore, enhancing the battery performance of the all-solid battery.

Patent Literature 2 discloses a winding type all solid state battery obtained by winding a laminate including a cathode layer, an anode layer and a solid electrolyte layer formed between the cathode and anode layers, in which binder concentrations of the solid electrolyte layer are adjusted to be different in a winding direction thereof.

Patent Literature 3 discloses a solid battery in which, in a plane view, an outer peripheral end of a solid electrolyte layer is on an outer side than an outer peripheral end of a cathode layer and an outer peripheral end of an anode layer 4 and in a plane view, a portion of the solid electrolyte layer not overlaid on the cathode or anode layer contains a smaller amount of the solid electrolyte than a portion overlaid on the layer, or does not contain the solid electrolyte.

Patent Literature 1: Japanese Patent Application Laid-Open (JP-A) No. 2015-069843

Patent Literature 2: JP-A No. 2015-103433

Patent Literature 3: JP-A No. 2013-243004

Peeling-off of a solid electrolyte layer can be suppressed by increasing the amount of a binder contained in the solid electrolyte layer. However, this is problematic in that the resistance of the solid electrolyte layer increases to increase the resistance of an all-solid-state battery comprising the solid electrolyte layer.

SUMMARY

In light of the above circumstances, an object of the disclosed embodiments is to provide an all-solid-state battery which is configured to suppress an increase in the resistance of the all-solid-state battery and which is configured to suppress the peeling-off of the solid electrolyte layer.

In a first embodiment, there is provided an all-solid-state battery comprising:
a cathode comprising a cathode layer,
an anode comprising an anode layer, and
a solid electrolyte layer disposed between the cathode layer and the anode layer,
wherein a width of the cathode layer is smaller than a width of the anode layer and a width of the solid electrolyte layer;
wherein the solid electrolyte layer comprises a non-facing portion where the solid electrolyte layer does not face the cathode layer and a facing portion where the solid electrolyte layer faces the cathode layer; and
wherein a binder content of the non-facing portion is larger than a binder content of the facing portion.

The all-solid-state battery of the disclosed embodiments may be an all-solid-state battery wherein, for a thickness of the non-facing portion, when a cathode layer-side surface of the non-facing portion is determined as 0, and an anode layer-side surface thereof is determined as 1, and
when the non-facing portion is divided into two vertically to thickness direction, at a position of 0.1 from the cathode layer-side surface of the non-facing portion toward the anode layer-side surface thereof, and the cathode layer side and the anode layer side are determined as a first region and a second region, respectively,
the non-facing portion comprises a binder concentrated region where a binder content of the first region is larger than a binder content of the second region.

According to the disclosed embodiments, an all-solid-state battery which is configured to suppress an increase in the resistance of the all-solid-state battery and which is configured to suppress the peeling-off of the solid electrolyte layer, is provided.

BRIEF DESCRIPTION OF THE DRAWINGS

In the accompanying drawings.

DETAILED DESCRIPTION

The all-solid-state battery of the disclosed embodiments is an all-solid-state battery comprising:
a cathode comprising a cathode layer,
an anode comprising an anode layer, and
a solid electrolyte layer disposed between the cathode layer and the anode layer,
wherein a width of the cathode layer is smaller than a width of the anode layer and a width of the solid electrolyte layer;
wherein the solid electrolyte layer comprises a non-facing portion where the solid electrolyte layer does not face the cathode layer and a facing portion where the solid electrolyte layer faces the cathode layer; and
wherein a binder content of the non-facing portion is larger than a binder content of the facing portion.

For an all-solid-state battery having a laminate structure, the end part has a brittle structure.

For the all-solid-state battery having the laminate structure, the width of the cathode layer is generally smaller than the width of the anode layer, for the purpose of suppressing the formation of dendrites of metal ions serving as a charge carrier, such as lithium ions. In addition, the cathode layer is disposed to ensure that, when the all-solid-state battery is viewed from above, the periphery of the cathode layer is disposed on the inside of the periphery of the solid electrolyte layer and on the inside of the periphery of the anode layer. Accordingly, a portion where the cathode layer is not present (i.e., the non-facing portion) is present on the solid electrolyte layer, and the all-solid-state battery obtains a stepped structure.

Accordingly, when the laminate is pressed at high pressure to produce the all-solid-state battery, the peeling-off of the end part of the solid electrolyte layer and/or the end part of the anode layer may occur, which starts from the end edge in plane direction of the cathode layer.

When the solid electrolyte layer of the all-solid-state battery is composed of solid electrolyte particles, due to mechanical stress such as vibration, the peeling-off of the solid electrolyte is likely to occur especially in the non-cathode layer-facing portion, which a portion that is free of confining pressure, and the peeling-off may be a cause of short circuits in the all-solid-state battery.

In conventional techniques, the peeling-off of the solid electrolyte layer is suppressed by increasing both the binder content of the non-cathode layer-facing portion of the solid electrolyte layer and the binder content of the cathode layer-facing portion thereof. In return, however, there is a problem in that the resistance of the all-solid-state battery increases.

It was found that by increasing the binder content of the non-cathode layer-facing portion of the solid electrolyte layer larger than the binder content of the cathode layer-facing portion thereof, an increase in the resistance of the all-solid-state battery and the peeling-off of the solid electrolyte layer are suppressed.

It was also found that by increasing the binder content of the cathode layer-side predetermined region of the non-cathode layer-facing portion of the solid electrolyte layer larger than the binder content of the remaining region of the non-cathode layer-facing portion thereof, an increase in the resistance of the all-solid-state battery and the peeling-off of the solid electrolyte layer are suppressed.

Figure 1:
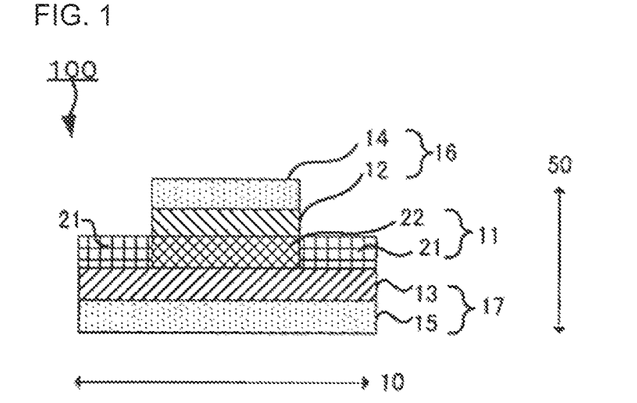
FIG. 1 is a schematic sectional view of an example of the all-solid-state battery of the disclosed embodiments.

FIG. 1 is a schematic sectional view of an example of the all-solid-state battery of the disclosed embodiments. In the accompanying drawings, for ease of illustration and understanding, components shown in the figures are appropriately scaled, or the horizontal to vertical dimensional ratio of the components is changed from the actual ratio and enlarged.

As shown in FIG. 1, an all-solid-state battery 100 comprises a cathode 16 comprising a cathode layer 12 and a cathode current collector 14, an anode 17 comprising an anode layer 13 and an anode current collector 15, and a solid electrolyte layer 11 disposed between the cathode 16 and the anode 17. Also in FIG. 1, a plane direction 10 is the plane direction of the all-solid-state battery 100, and a laminating direction 50 is the laminating direction thereof.

In FIG. 1, the width of the cathode layer 12 (the length in the plane direction 10) is smaller than the width of the anode layer 13 and the width of the solid electrolyte layer 11.

In FIG. 1, the width of the anode layer 13 is the same as the width of the solid electrolyte layer 11.

In FIG. 1, the solid electrolyte layer 11 comprises a non-facing portion 21 where the solid electrolyte layer 11 does not face the cathode layer 12 and a facing portion 22 where the solid electrolyte layer 11 faces the cathode layer 12. In the disclosed embodiments, the binder content of the non-facing portion 21 is larger than the binder content of the facing portion 22.

Figure 2:
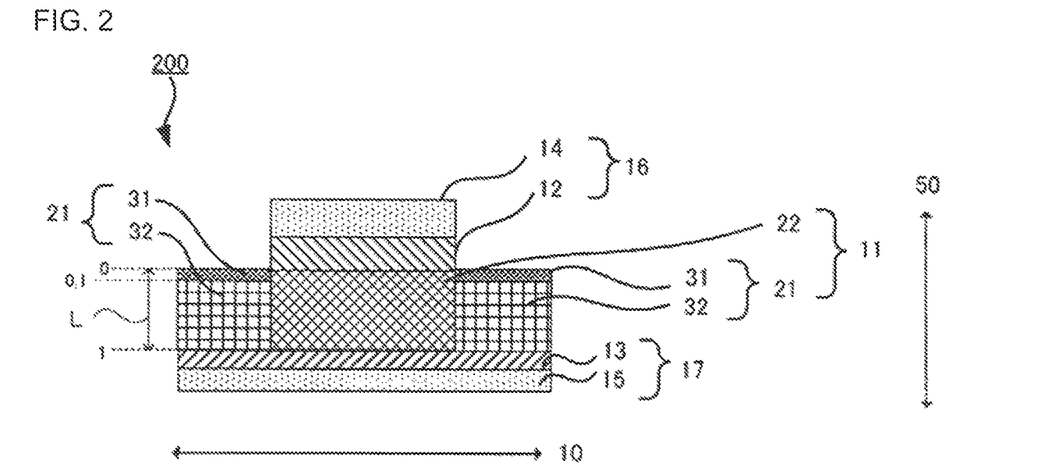
FIG. 2 is a schematic sectional view of another example of the all-solid-state battery of the disclosed embodiments.

FIG. 2 is a schematic sectional view of another example of the all-solid-state battery of the disclosed embodiments. Of the reference signs shown in FIG. 2, those shown in FIG. 1 will not be described here.

In FIG. 2, for a thickness L of the non-facing portion 21, when a cathode layer 12-side surface of the non-facing portion 21 is determined as 0, and an anode layer 13-side surface thereof is determined as 1, and when the non-facing portion 21 is divided into two vertically to thickness direction (laminating direction 50), at a position of 0.1 from the cathode layer 12-side surface of the non-facing portion 21 toward the anode layer 13-side surface thereof, and the cathode layer 12 side and the anode layer 13 side are determined as a first region 31 and a second region 32, respectively, the non-facing portion 21 comprises a binder concentrated region (the first region 31) where a binder content of the first region 31 is larger than a binder content of the second region 32.

The figure shown in FIG. 2 is not in actual size.

Figure 3:
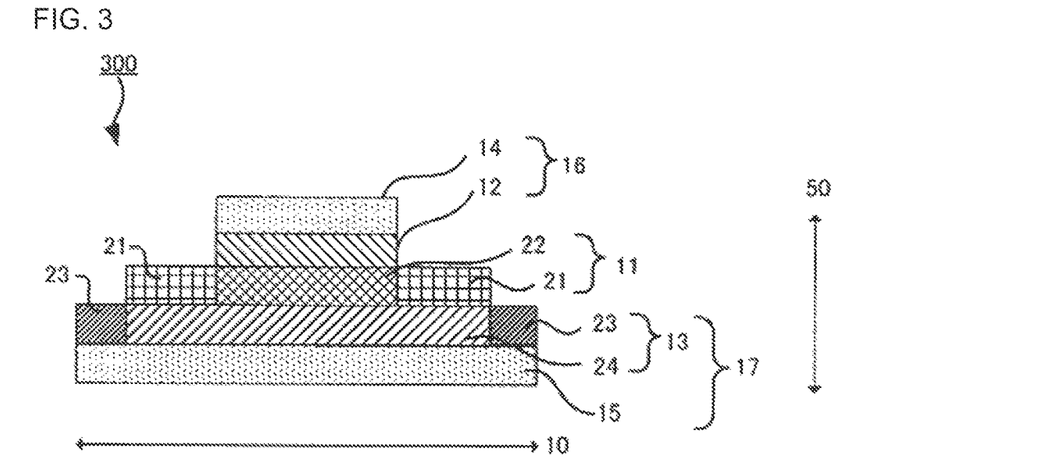
FIG. 3 is a schematic sectional view of another example of the all-solid-state battery of the disclosed embodiments.

FIG. 3 is a schematic sectional view of another example of the all-solid-state battery of the disclosed embodiments. Of the reference signs shown in FIG. 3, those shown in FIGS. 1 and 2 will not be described here.

In FIG. 3, the width of the anode layer 13 is larger than the width of the solid electrolyte layer 11.

Also in FIG. 3, the anode layer 13 comprises a second non-facing portion 23 where the anode layer 13 does not face the solid electrolyte layer 11 and a second facing portion 24 where the anode layer 13 faces the solid electrolyte layer 11. In the disclosed embodiments, from the viewpoint of suppressing the peeling-off of the anode layer 13, the binder content of the second non-facing portion 23 may be larger than the binder content of the second facing portion 24.

For the thickness of the second non-facing portion 23, which is not shown in FIG. 3, when a solid electrolyte layer 11-side surface of the second non-facing portion 23 is determined as 0, and an anode current collector 15-side surface thereof is determined as 1, and when the second non-facing portion 23 is divided into two vertically to thickness direction (laminating direction 50), at a position of 0.1 from the solid electrolyte layer 11-side surface of the second non-facing portion 23 toward the anode current collector 15-side surface thereof, and the solid electrolyte layer 11 side and the anode current collector 15 side are determined as a third region and a fourth region, respectively, the third region may be a binder concentrated region where the binder content of the third region is larger than the binder content of the fourth region, from the viewpoint of further suppressing the peeling-off of the anode layer 13.

[Solid Electrolyte Layer]

The solid electrolyte layer comprises at least a solid electrolyte.

The width of the solid electrolyte layer (the length in plane direction) is larger than the width of the cathode layer. The width of the solid electrolyte layer may be larger than the width of the cathode layer, may be the same as the width of the anode layer, or may be smaller than the width of the anode layer. The width of the solid electrolyte layer may be appropriately determined depending on the intended applications of the all-solid-state battery.

From the viewpoint of suppressing dendrite formation, the cathode layer may be disposed on the solid electrolyte layer to ensure that, when the all-solid-state battery is viewed from the above, the periphery of the cathode layer is on the inside of the periphery of the solid electrolyte layer and on the inside of the periphery of the anode layer.

The solid electrolyte layer comprises the non-facing portion where the solid electrolyte layer does not face the cathode layer and the facing portion where the solid electrolyte layer faces the cathode layer. The width of the non-facing portion and that of the facing portion are not particularly limited. From the viewpoint of increasing the energy density of the all-solid-state battery, the width of the non-facing portion may be smaller than the width of the facing portion, and when the total width of the solid electrolyte layer is determined as 100, the width of the non-facing portion may be from 1 to 10.

For example, from the viewpoint of forming the solid electrolyte layer in which excess aggregation of the solid electrolyte is prevented and in which the solid electrolyte is uniformly dispersed, for the purpose of easily obtaining a high-output, all-solid-state battery, the binder content of the facing portion of the solid electrolyte layer may be as follows: when the total mass of the facing portion is determined as 100 mass %, the binder content of the facing portion is less than 5 mass %, or it is 1 mass % or less.

The binder content of the non-facing portion is larger than the binder content of the facing portion. From the viewpoint of further suppressing the peeling-off of the solid electrolyte layer, the binder content ratio of the non-facing portion and the facing portion may be as follows: when the binder content of the facing portion is determined as 1, the binder content of the non-facing portion is from 1.1 to 10 or from 1.1 to 5, with respect to the binder content of the facing portion.

The binder content of the non-facing portion of the solid electrolyte layer is not particularly limited, as long as it is larger than the binder content of the facing portion. From the viewpoint of obtaining a high-output, all-solid-state battery, etc., the binder content of the non-facing portion may be as follows: when the total mass of the non-facing portion is determined as 100 mass %, the upper limit of the binder content of the non-facing portion may be 10 mass % or less, or it may be 5 mass % or less, and the lower limit may be more than 1 mass %.

The amount of a binder-containing solution used to impregnate the non-facing portion with the solution and/or to deposit the solution on the non-facing portion, can be controlled by controlling the voidage of the solid electrolyte layer (by controlling press pressure in the formation of the solid electrolyte layer), or controlling the viscosity of a solvent applied to the non-facing portion, for example. Accordingly, the thickness of the non-facing portion to be formed and the binder content of the non-facing portion can be controlled.

The binder content of the non-facing portion can be confirmed by electron probe micro analyzer (EPMA).

For a thickness of the non-facing portion, when a cathode layer-side surface of the non-facing portion is determined as 0, and an anode layer-side surface thereof is determined as 1, and when the non-facing portion is divided into two vertically to thickness direction, at a position of 0.1 from the cathode layer-side surface of the non-facing portion toward the anode layer-side surface thereof, and the cathode layer side and the anode layer side are determined as a first region and a second region, respectively, the first region may be the binder concentrated region where the binder content of the first region is larger than the binder content of the second region.

From the viewpoint of further suppressing the peeling-off of the solid electrolyte layer, the binder content of the first region may be as follows: when the total mass of the first region is determined as 100 mass %, the binder content of the first region is from 2 mass % to 100 mass %, or it is from 5 mass % to 100 mass %.

In the case of forming the binder concentrated region in the non-facing portion, the binder content of the second region may be smaller than the binder content of the first region, and it may be equal to or larger than the binder content of the facing portion.

As the method for forming the binder concentrated region, examples include, but are not limited to, the following methods. In one method, the binder is dissolved in a solvent to prepare a solution, and the solution is applied to the cathode layer-side surface of the non-facing portion to impregnate the non-facing portion with the solution, thereby forming the binder concentrated region. In another method, the binder is applied to the cathode layer-side surface of the non-facing portion, and the applied binder is dried, thereby forming the binder concentrated region on the cathode layer-side surface of the non-facing portion.

The binder content of the binder concentrated region can be controlled by controlling the voidage of the solid electrolyte layer (by controlling press pressure in the formation of the solid electrolyte layer) or controlling the viscosity of the solvent.

The binder content of the binder concentrated region can be confirmed by EPMA.

The presence or absence of the binder concentrated region can be confirmed by observation with a scanning electron microscope (SEM).

As the solid electrolyte, examples include, but are not limited to, a sulfide-based solid electrolyte and an oxide-based solid electrolyte.

As the sulfide-based solid electrolyte, examples include, but are not limited to, $Li_2S$—$P_2S_5$, $Li_2S$—$SiS_2$, $LiX$—$Li_2S$—$SiS_2$, $LiX$—$Li_2S$—$P_2S_5$, $LiX$—$Li_2O$—$Li_2S$—$P_2S_5$, $LiX$—$Li_2S$—$P_2O_5$, $LiX$—$Li_3PO_4$—$P_2S_5$ and $Li_3PS_4$. The "$Li_2S$—$P_2S_5$" means a material composed of a raw material composition containing $Li_2S$ and $P_2S_5$, and the same applies to other solid electrolytes. Also, "X" in the "LiX" means a halogen element. The LiX contained in the raw material composition may be one or more kinds. When two or more kinds of LiX are contained in the raw material composition, the mixing ratio is not particularly limited.

The molar ratio of the elements in the sulfide-based solid electrolyte can be controlled by controlling the contents of the elements contained in raw materials. The molar ratio and composition of the elements in the sulfide-based solid electrolyte can be measured by inductively coupled plasma atomic emission spectroscopy, for example.

The sulfide-based solid electrolyte may be a sulfide glass, a crystallized sulfide glass (a glass ceramics) or a crystalline material obtained by developing a solid state reaction of the raw material composition.

The crystal state of the sulfide-based solid electrolyte can be confirmed by X-ray powder diffraction measurement using CuKα radiation, for example.

The sulfide glass can be obtained by amorphizing a raw material composition (such as a mixture of $Li_2S$ and $P_2S_5$). The raw material composition can be amorphized by mechanical milling, for example. The mechanical milling may be dry mechanical milling or wet mechanical milling. The mechanical milling may be the latter because attachment of the raw material composition to the inner surface of a container, etc., can be prevented.

The mechanical milling is not particularly limited, as long as it is a method for mixing the raw material composition by applying mechanical energy thereto. The mechanical milling may be carried out by, for example, a ball mill, a vibrating mill, a turbo mill, mechanofusion, or a disk mill. The mechanical milling may be carried out by a ball mill, or it may be carried out by a planetary ball mill. This is because the desired sulfide glass can be efficiently obtained.

The glass ceramics can be obtained by heating the sulfide glass, for example.

For the heating, the heating temperature may be a temperature higher than the crystallization temperature (Tc) of the sulfide glass, which is a temperature observed by thermal analysis measurement. In general, it is 195° C. or more. On the other hand, the upper limit of the heating temperature is not particularly limited.

The crystallization temperature (Tc) of the sulfide glass can be measured by differential thermal analysis (DTA).

The heating time is not particularly limited, as long as the desired crystallinity of the glass ceramics is obtained. For example, it is in a range of from one minute to 24 hours, or it may be in a range of from one minute to 10 hours.

The heating method is not particularly limited. For example, a firing furnace may be used.

As the oxide-based solid electrolyte, examples include, but are not limited to, $Li_{6.25}La_3Zr_2Al_{0.25}O_{12}$, $Li_3PO_4$, and $Li_{3+x}PO_{4-x}N_x$ (LiPON).

From the viewpoint of handling, the form of the solid electrolyte may be a particulate form.

The average particle diameter ($D_{50}$) of the solid electrolyte particles is not particularly limited. The lower limit may be 0.5 µm or more, and the upper limit may be 2 µm or less.

As the solid electrolyte, one or more kinds of solid electrolytes may be used. In the case of using two or more kinds of solid electrolytes, they may be mixed together.

In the disclosed embodiments, unless otherwise noted, the average particle diameter of particles is a volume-based median diameter ($D_{50}$) measured by laser diffraction/scattering particle size distribution measurement. Also in the disclosed embodiments, the median diameter ($D_{50}$) of particles is a diameter at which, when particles are arranged in ascending order of their particle diameter, the accumulated volume of the particles is half (50%) the total volume of the particles (volume average diameter).

The solid electrolyte content of the cathode layer-facing portion of the solid electrolyte layer may be as follows, for example: when the total mass of the facing portion is determined as 100 mass %, the solid electrolyte content of the facing portion is from 50 mass % to 99 mass %, or it is from 93 mass % to 99 mass %.

The solid electrolyte content of the non-cathode layer-facing portion of the solid electrolyte layer may be as follows, for example: when the total mass of the non-facing portion is determined as 100 mass %, the solid electrolyte content of the non-facing portion is 50 mass % or more and less than 99 mass %, or it is from 93 mass % to 95 mass %.

The binder contained in the solid electrolyte layer is not particularly limited, as long as it is less likely to deteriorate the solid electrolyte. As the binder, examples include, but are not limited to, a butylene rubber-based binder and a fluoride-based binder, such as acrylonitrile-butadiene rubber (ABR), butadiene rubber (BR), polyvinylidene fluoride (PVdF) and styrene-butadiene rubber (SBR).

The thickness of the cathode layer-facing portion of the solid electrolyte layer is appropriately determined, depending on battery structure, and it is not particularly limited. The thickness of the cathode layer-facing portion of the solid electrolyte layer may be 0.1 µm or more and 1 mm or less.

The thickness of the cathode layer-facing portion and the thickness of the non-cathode layer-facing portion may be the same thickness. The thickness of the non-facing portion may be larger than the thickness of the facing portion. The thickness of the non-facing portion may be the total thickness of the thickness of the facing portion and the thickness of the cathode layer, at the maximum. From the viewpoint of increasing the energy density of the all-solid-state battery, the thickness of the non-facing portion may be 1.0 to 1.1 times the thickness of the facing portion.

The method for forming the solid electrolyte layer may be as follows, for example. First, a solid electrolyte layer slurry containing the solid electrolyte, the binder, the solvent and, as needed, other components is prepared. The slurry is applied on a support. The applied slurry is dried, thereby obtaining a product. Then, a portion that is expected to become the non-cathode layer-facing portion of the product, is impregnated with the solution obtained by dissolving the binder in the solvent, thereby obtaining the solid electrolyte layer in which the binder content of the non-cathode layer-facing portion is larger than the binder content of the cathode layer-facing portion.

Another method for forming the solid electrolyte layer may be as follows, for example. First, a first solid electrolyte layer slurry and a second solid electrolyte layer slurry are prepared, which are different in binder content. The first solid electrolyte layer slurry, which is smaller in binder content, is used as a material for the cathode layer-facing portion, and the first solid electrolyte layer slurry is applied on a support. The applied first solid electrolyte layer slurry is dried, thereby obtaining a first product which becomes the facing portion. Then, the cathode layer which has the same width as the first product, is formed on the first product to ensure that, when an assembly of the first product and the cathode layer is viewed from above, the cathode layer and the first product are overlaid on each other. Accordingly, the first product becomes the cathode layer-facing portion. Next, the second solid electrolyte layer slurry, which is larger in binder content, is used as a material for the non-cathode layer-facing portion, and the second solid electrolyte layer slurry is applied to a position that is adjacent to the facing portion on the support, or it is applied around the facing portion. The applied second solid electrolyte layer slurry is dried, thereby obtaining a second product. Accordingly, the second product becomes the non-cathode layer-facing portion.

The solid electrolyte layer in which the binder content of the non-cathode layer-facing portion is larger than the binder content of the cathode layer-facing portion, may be obtained in the above-described manner.

As the solvent, examples include, but are not limited to, butyl acetate, butyl butyrate, heptane and N-methyl-2-pyrrolidone.

The method for applying the slurry is not particularly limited. As the method, examples include, but are not limited to, a doctor blade method, a metal mask printing method, an electrostatic coating method, a dip coating method, a spray coating method, a roller coating method, a gravure coating method and a screen printing method.

As the support, a self-supporting material may be appropriately selected and used, without particular limitation. As the support, for example, a metal foil such as aluminum foil and nickel foil may be used. In the case of forming the solid electrolyte layer, the support may be the anode layer or the cathode layer.

[Cathode]

The cathode comprises at least the cathode layer. As needed, it comprises the cathode current collector.

The cathode layer comprises a cathode active material. As optional components, the cathode layer may comprise a solid electrolyte, an electroconductive material, a binder, etc.

The width of the cathode layer is smaller than the width of the anode layer and the width of the solid electrolyte layer. That is, the area in plane direction of the cathode layer is smaller than the area in plane direction of the anode layer and the area in plane direction of the solid electrolyte layer. In addition, from the viewpoint of suppressing dendrite formation, the cathode layer may be disposed on the solid electrolyte layer to ensure that, when the all-solid-state battery is viewed from above, the periphery of the cathode layer is disposed on the inside of the periphery of the solid electrolyte layer and on the inside of the periphery of the anode layer.

The width of the cathode layer may be smaller than the width of the anode layer and the width of the solid electrolyte layer. The width of the cathode layer may be appropriately determined depending on the intended applications of the all-solid-state battery.

The type of the cathode active material is not particularly limited. As the cathode active material, examples include, but are not limited to, a cathode active material represented by the following general formula: $Li_xM_yO_z$ (where M is a transition metal element; x is from 0.02 to 2.2; y is from 1 to 2; and z is from 1.4 to 4). The transition metal element M may be at least one selected from the group consisting of Co, Mn, Ni, V, Fe and Si, or it may be at least one selected from the group consisting of Co, Ni and Mn. As the cathode active material represented by the general formula $Li_xM_yO_z$, examples include, but are not limited to, $LiCoO_2$, $LiMnO_2$, $LiNiO_2$, $LiVO_2$, $LiNi_{1/3}Co_{1/3}Mn_{1/3}O_2$, $LiMn_2O_4$, $Li(Ni_{0.5}Mn_{1.5})O_4$, $Li_2FeSiO_4$ and $Li_2MnSiO_4$.

Cathode active materials other than the one represented by the general formula $Li_xM_yO_z$ include, for example, lithium titivates (such as $Li_4Ti_5O_{12}$), lithium metal phosphates (such as $LiFePO_4$, $LiMnPO_4$, $LiCoPO_4$ and $LiNiPO_4$), transition metal oxides (such as $V_2O_5$ and $MoO_3$), $TiS_2$, LiCoN, Si, $SiO_2$, $Li_2SiO_3$, $Li_4SiO_4$, and lithium storage intermetallic compounds (such as $Mg_2Sn$, $Mg_2Ge$, $Mg_2Sb$ and $Cu_3Sb$).

The form of the cathode active material is not particularly limited. From the viewpoint of handling, it may be a particulate form.

A coating layer containing a Li ion conducting oxide may be formed on the surface of the cathode active material. This is because a reaction between the cathode active material and the solid electrolyte can be suppressed.

As the Li ion conducting oxide, examples include, but are not limited to, $LiNbO_3$, $Li_4Ti_5O_{12}$ and $Li_3PO_4$. For the thickness of the coating layer, the lower limit may be 0.1 nm or more, or it may be 1 nm or more, for example. On the other hand, the upper limit may be 100 nm or less, or it may be 20 nm or less, for example.

The content of the cathode active material in the cathode layer is not particularly limited. For example, when the total mass of the cathode layer is determined as 100 mass %, the content of the cathode active material may be in a range of from 10 mass % to 100 mass %.

As the solid electrolyte used in the cathode layer, examples include, but are not limited to, those exemplified above as the solid electrolyte used in the solid electrolyte layer.

The content of the solid electrolyte in the cathode layer is not particularly limited. For example, when the total mass of the cathode layer is determined as 100 mass %, the content of the solid electrolyte may be in a range of from 1 mass % to 80 mass %.

As the electroconductive material, a known electroconductive material may be used. As the electroconductive material, examples include, but are not limited to, a carbonaceous material and metal particles. For example, the carbonaceous material may be at least one selected from the group consisting of carbon nanotube, carbon nanofiber and carbon black such as acetylene black or furnace black. Of them, from the viewpoint of electron conductivity, the electroconductive material may be at least one selected from the group consisting of carbon nanotube and carbon nanofiber. The carbon nanotube and the carbon nanofiber may be vapor-grown carbon fiber (VGCF). As the metal particles, examples include, but are not limited to, particles of Ni, particles of Cu, particles of Fe and particles of SUS.

The content of the electroconductive material in the cathode layer is not particularly limited.

As the binder, examples include, but are not limited to, those exemplified above as the binder used in the solid electrolyte layer. The content of the binder in the cathode layer is not particularly limited.

The thickness of the cathode layer is not particularly limited. For example, it may be from 10 μm to 250 μm, or it may be from 20 μm to 200 μm.

The cathode layer can be formed by a conventionally-known method.

For example, a cathode layer slurry is produced by putting the cathode active material and, as needed, other components in a solvent and mixing them. The cathode layer slurry is applied on one surface of a support such as the cathode current collector. The applied slurry is dried, thereby forming the cathode layer.

As the solvent, examples include, but are not limited to, butyl acetate, butyl butyrate, heptane and N-methyl-2-pyrrolidone.

As the method for applying the cathode layer slurry on one surface of the support such as the cathode current collector, examples include, but are not limited to, those exemplified above as the method for applying the solid electrolyte layer slurry.

The cathode layer may be formed by another method such as pressure-forming a powdered cathode mix that contains the cathode active material and, as needed, other components.

The pressure applying method is not particularly limited. As the method, examples include, but are not limited to, pressing by use of a plate press machine, a roll press machine or the like.

As the cathode current collector, a conventionally-known metal that is usable as a current collector in all-solid-state batteries, may be used. As the metal, examples include, but are not limited to, a metal material containing one or more elements selected from the group consisting of Cu, Ni, Al, V, Au, Pt, Mg, Fe, Ti, Co, Cr, Zn, Ge and In.

The form of the cathode current collector is not particularly limited. As the form, examples include, but are not limited to, various kinds of forms such as a foil form and a mesh form.

The form of the whole cathode is not particularly limited. It may be a sheet form. In this case, the thickness of the whole cathode is not particularly limited. It can be determined depending on desired performance.

[Anode]

The anode comprises at least an anode layer. As needed, the anode comprises an anode current collector.

The anode layer comprises an anode active material. As optional components, the anode layer may comprise a solid electrolyte, an electroconductive material, a binder, etc.

The width of the anode layer is larger than the width of the cathode layer. As long as the width of the anode layer is larger than the width of the cathode layer, the width of the anode layer may be the same as or larger than the width of the solid electrolyte layer, and it may be appropriately determined depending on the intended applications of the all-solid-state battery. That is, the area in plane direction of the anode layer may be larger than the area in plane direction of the cathode layer, and it may be equal to or larger than the area in plane direction of the solid electrolyte layer. When the all-solid-state battery is viewed from above, the anode layer may be overlaid on the solid electrolyte layer, or the solid electrolyte layer may be disposed on the anode layer to ensure that the periphery of the solid electrolyte layer is on the inside of the periphery of the anode layer.

In the case where the width of the anode layer is larger than the width of the solid electrolyte layer and the solid electrolyte layer is disposed on the anode layer to ensure that, when the all-solid-state battery is viewed from above, the periphery of the solid electrolyte layer is on the inside of the periphery of the anode layer, the anode layer comprises a second non-facing portion where the anode layer does not face the solid electrolyte layer and a second facing portion where the anode layer faces the solid electrolyte layer.

From the viewpoint of suppressing the peeling-off of the anode layer, the binder content of the second non-facing portion may be larger than the binder content of the second facing portion.

From the viewpoint of further suppressing the peeling-off of the anode layer, the binder content ratio of the second non-facing portion and the second facing portion may be as follows: when the binder content of the second facing portion is determined as 1, the binder content of the second non-facing portion may be from 1.1 to 10 with respect to the binder content of the second facing portion.

For the thickness of the second non-facing portion, when the solid electrolyte layer-side surface of the second non-facing portion is determined as 0, and the anode current collector-side surface thereof is determined as 1, and when the second non-facing portion is divided into two vertically to thickness direction, at a position of 0.1 from the solid electrolyte layer-side surface of the second non-facing portion toward the anode current collector-side surface thereof, and the solid electrolyte layer side and the anode current collector side are determined as the third region and the fourth region, respectively, the third region may be the binder concentrated region where the binder content of the third region is larger than the binder content of the fourth region.

From the viewpoint of further suppressing the peeling-off of the anode layer, the binder content of the third region may be as follows: when the total mass of the third region is determined as 100 mass %, the binder content of the third region may be from 2 mass % to 100 mass %, or it may be from 5 mass % to 100 mass %.

In the case of forming the binder concentrated region in the second non-facing portion, the binder content of the fourth region may be smaller than the binder content of the third region and may be equal to or more than the binder content of the second facing portion.

As the method for forming the binder concentrated region in the anode layer, examples include, but are not limited to, those exemplified above as the method for forming the binder concentrated region in the solid electrolyte layer.

As the anode active material, a conventionally-known material may be used. As the conventionally-known material, examples include, but are not limited to, elemental Li, a lithium alloy, carbon, elemental Si, a Si alloy and $Li_4Ti_5O_{12}$ (LTO).

As the lithium alloy, examples include, but are not limited to, LiSn, LiSi, LiAl, LiGe, LiSb, LiP and LiIn.

As the Si alloy, examples include, but are not limited to, alloys with metals such as Li. Also, the Si alloy may be an alloy with at least one kind of metal selected from the group consisting of Sn, Ge and Al.

The form of the anode active material is not particularly limited. For example, the anode active material may be in a particulate form or a thin film form.

When the anode active material is in a particulate form, the average particle diameter ($D_{50}$) of the anode active material particles may be 1 nm or more and 100 μm or less, or it may be 10 nm or more and 30 μm or less, for example.

As the electroconductive material, binder and solid electrolyte contained in the anode layer, examples include, but are not limited to, those exemplified above as the electroconductive material, binder and solid electrolyte contained in the above-described cathode layer.

The method for forming the anode layer is not particularly limited. As the method, examples include, but are not limited to, pressure-forming a powdered anode mix that contains the anode active material and, as needed, other components such as an electroconductive material and a binder.

As the pressure applying method, examples include, but are not limited to, those exemplified above as the method for applying pressure to the cathode layer.

Another example of the method for forming the anode layer is as follows: an anode layer slurry containing the anode active material, a solvent and, as needed, other components such as an electroconductive material and a binder, is prepared; the anode layer slurry is applied on one surface of a support such as the anode current collector or the solid electrolyte layer; and the applied anode layer slurry is dried, thereby forming the anode layer. As the solvent used in the anode layer slurry, examples include, but are not limited to, those exemplified above as the solvent used in the cathode layer slurry. As the method for applying the anode layer slurry on one surface of the support such as the anode current collector or the solid electrolyte layer, examples include, but are not limited to, those exemplified above as the method for applying the cathode layer slurry.

When the anode layer comprises the second non-solid electrolyte layer-facing portion and the second solid electrolyte layer-facing portion, as the method for forming the second non-facing portion and the second facing portion, examples include, but are not limited to, those exemplified above as the method for forming the non-facing portion and facing portion of the solid electrolyte layer.

The anode current collector may be selected from those exemplified above as the metal that is usable as the cathode current collector.

The form of the anode current collector is not particularly limited. It may be the same as the form of the cathode current collector.

The form of the whole anode is not particularly limited. It may be a sheet form. In this case, the thickness of the whole anode is not particularly limited. It can be determined depending on desired performance.

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resin.

As the all-solid-state battery, examples include, but are not limited to, an all-solid-state lithium battery in which a lithium metal deposition-dissolution reaction is used as an anode reaction, an all-solid-state lithium ion battery in which lithium ions transfer between the cathode and the anode, an all-solid-state sodium battery, an all-solid-state magnesium battery and an all-solid-state calcium battery. The all-solid-state battery may be the all-solid-state lithium ion battery. Also, the all-solid-state battery may be a primary or secondary battery.

As the form of the all-solid-state battery, examples include, but are not limited to, a coin form, a laminate form, a cylindrical form and a square form.

An example of the method for producing the all-solid-state battery of the disclosed embodiments, is as follows. First, the anode layer slurry is applied on one surface of the anode current collector, and the applied anode layer slurry is dried, thereby forming the anode layer.

Then, the solid electrolyte layer slurry is applied on the anode layer, and the applied solid electrolyte layer slurry is dried, thereby forming the solid electrolyte layer.

Then, the cathode layer slurry is applied on the solid electrolyte layer to ensure that the cathode layer is disposed to ensure that, when viewed from above, the periphery of the cathode layer is on the inside of the solid electrolyte layer. The applied cathode layer slurry is dried, thereby forming the cathode layer.

Then, the non-cathode layer-facing portion of the solid electrolyte layer is impregnated with a solution obtained by dissolving the binder in the solvent, thereby forming the solid electrolyte layer in which the binder content of the non-cathode layer-facing portion is larger than the binder content of the cathode layer-facing portion, and the non-facing portion comprises the binder concentrated region.

As needed, the cathode current collector may be disposed on the cathode layer, thereby obtaining the all-solid-state battery.

Another example of the method for producing the all-solid-state battery of the disclosed embodiments, is as follows. First, the anode layer slurry is applied on one surface of the anode current collector, and the applied anode layer slurry is dried, thereby forming the anode layer.

Then, the first solid electrolyte layer slurry containing the binder is applied on a portion that is expected to become the cathode layer-facing portion of the anode layer. The applied first solid electrolyte layer slurry is dried, thereby forming the first solid electrolyte layer.

Then, the cathode layer slurry is applied on the first solid electrolyte layer to ensure that, when viewed from above, the cathode layer is overlaid on the first solid electrolyte layer. The applied cathode layer slurry is dried, thereby forming the cathode layer and the cathode layer-facing portion of the solid electrolyte layer.

Then, the second solid electrolyte layer slurry, which is larger in binder concentration than the first solid electrolyte layer slurry, is applied on the non-first solid electrolyte layer-facing portion of the anode layer. The applied second solid electrolyte layer slurry is dried, thereby forming the non-facing portion of the solid electrolyte layer, where the solid electrolyte layer does not face the cathode layer. Accordingly, the solid electrolyte layer in which the binder content of the non-cathode layer-facing portion is larger than the binder content of the cathode layer-facing portion, is formed.

As needed, the solution obtained by dissolving the binder in the solvent, may be applied to the non-cathode layer-facing portion of the solid electrolyte layer to impregnate the non-cathode layer-facing portion with the solution and/or to deposit the solution on the non-cathode layer-facing portion, thereby forming the solid electrolyte layer in which the non-facing portion comprises the binder concentrated region.

Then, as needed, the cathode current collector may be disposed on the cathode layer, thereby forming the all-solid-state battery.

The production of the all-solid-state battery may be carried out in the state that moisture is removed from the system as much as possible. For example, it is thought to be effective to depressurize the inside of the system in the production steps and to replace the inside of the system by a substantially moisture-free gas (such as inert gas) in the production steps.

EXAMPLES

Example 1

[Production of Cathode]

LiNbO$_3$-coated, LiNi$_{1/3}$Mn$_{1/3}$Co$_{1/3}$O$_2$ particles (serving as a cathode active material) and Li$_3$PS$_4$ (serving as a sulfide-based solid electrolyte) were weighed in a mass ratio of 75:25.

With respect to 100 parts by mass of the cathode active material, a PVdF-based binder was weighed to 4 parts by mass, and acetylene black (serving as an electroconductive material) was weighed to 6 parts by mass.

They were added to butyl butyrate (serving as a solvent) to a solid content of 70 mass %. They were mixed by a stirrer, thereby obtaining a cathode layer slurry.

Next, the cathode layer slurry was applied on an aluminum foil (serving as a cathode current collector) by blade coating with an applicator. The applied cathode layer slurry was dried at 120° C. for 3 minutes, thereby obtaining a cathode in which the cathode layer (thickness 30 μm) was disposed on the cathode current collector (thickness 15 μm).

[Production of Anode]

LTO (serving as an anode active material) and Li$_3$PS$_4$ (serving as a sulfide-based solid electrolyte) were weighed in a mass ratio of 50:50. With respect to 100 parts by mass of the anode active material, a PVdF-based binder was weighed to 6 parts by mass, and acetylene black (serving as an electroconductive material) was weighed to 6 parts by mass. They were added to butyl butyrate (serving as a solvent) to a solid content of 70 mass %. They were mixed by a stirrer, thereby obtaining an anode layer slurry. Next, the anode layer slurry was applied on an aluminum foil (serving as an anode current collector) by blade coating with an applicator. The applied anode layer slurry was dried at 120° C. for 3 minutes, thereby obtaining an anode in which the anode layer (thickness 60 μm) was disposed on the anode current collector (thickness 15 μm).

[Production of Solid Electrolyte Layer]

Li$_3$PS$_4$ (serving as a sulfide-based solid electrolyte) and a butylene rubber-based binder were weighed in a mass ratio of 99:1. They were added to heptane (serving as a solvent)

to a solid content of 70 mass %. They were mixed by an ultrasonic disperser, thereby obtaining a solid electrolyte layer slurry.

Next, the solid electrolyte layer slurry was applied on an aluminum foil (serving as a support) by blade coating with an applicator. The applied solid electrolyte layer slurry was dried naturally and then dried at 100° C. for 30 minutes, thereby forming a solid electrolyte layer (thickness 30 μm) on the aluminum foil.

[Production of All-Solid-State Battery]

The solid electrolyte layer was disposed on the anode layer of the anode. The aluminum foil was peeled off from the solid electrolyte layer. Then, the cathode layer of the cathode was disposed on the solid electrolyte layer. The cathode, the solid electrolyte layer and the anode were stacked and pressed at a press pressure of 1 ton/cm, thereby obtaining a laminate 1. At that time, the cathode layer was disposed on the solid electrolyte layer to ensure that, when the resulting laminate 1 was viewed from above, the periphery of the cathode layer was on the inside of the periphery of the solid electrolyte layer.

Then, a binder solution was prepared by dissolving a butylene rubber-based binder in a heptane solvent.

Then, the binder solution was applied to the non-cathode layer-facing portion (i.e., the non-facing portion) of the solid electrolyte layer to impregnate the non-facing portion with the solution and/or to deposit the solution on the non-facing portion to ensure that, when the total mass of the non-facing portion was determined as 100 mass %, the binder content of the non-facing portion after drying the binder solution was 5 mass %. Accordingly, a binder concentrated region was formed in the non-facing portion.

The non-facing portion of the solid electrolyte layer was observed by scanning electron microscopy (SEM) to check the presence or absence of the binder concentrated region. As a result, the presence of the binder concentrated region was confirmed.

Then, the laminate 1 was hermetically wrapped in an aluminum laminate film with a terminal, thereby obtaining an all-solid-state battery 1.

Example 2

[Production of Cathode]

A cathode was obtained in the same manner as Example 1.

[Production of Anode]

An anode was obtained in the same manner as Example 1.

[Production of Solid Electrolyte Layer for Cathode Layer-Facing Portion]

Li$_3$PS$_4$ (serving as a sulfide-based solid electrolyte) and a butylene rubber-based binder were weighed in a mass ratio of 99:1. They were added to heptane (serving as a solvent) to a solid content of 70 mass %. They were mixed by the ultrasonic disperser, thereby obtaining a facing portion slurry.

Next, the facing portion slurry was applied on an aluminum foil (serving as a support) by blade coating with an applicator. The applied facing portion slurry was dried naturally and then dried at 100° C. for 30 minutes, thereby forming a solid electrolyte layer (thickness 30 μm) for a facing portion on the aluminum foil.

[Production of Solid Electrolyte Layer for Non-Cathode Layer-Facing Portion]

Li$_3$PS$_4$ (serving as a sulfide-based solid electrolyte) and a butylene rubber-based binder were weighed in a mass ratio of 95:5. They were added to heptane (serving as a solvent) to a solid content of 70 mass %. They were mixed by the ultrasonic disperser, thereby obtaining a non-facing portion slurry (a slurry for the non-cathode layer-facing portion of a solid electrolyte layer).

Next, the non-facing portion slurry was applied on an aluminum foil (serving as a support) by blade coating with an applicator. The applied non-facing portion slurry was dried naturally and then dried at 100° C. for 30 minutes, thereby forming a solid electrolyte layer (thickness 30 μm) for the non-facing portion on the aluminum foil.

[Production of All-Solid-State Battery 2]

The solid electrolyte layer for the facing portion was disposed on the center of the anode layer of the anode, and the solid electrolyte layer for the non-facing portion was disposed around the solid electrolyte layer for the facing portion on the anode layer of the anode, thereby forming a solid electrolyte layer comprising the solid electrolyte layer for the facing portion and the solid electrolyte layer for the non-facing portion.

Then, the aluminum foil was peeled off from each of the solid electrolyte layer for the facing portion and the solid electrolyte layer for the non-facing portion.

Then, the cathode layer of the cathode was disposed on the solid electrolyte layer for the facing portion. The cathode, the solid electrolyte layer and the anode were stacked and pressed at a press pressure of 1 ton/cm, thereby obtaining a laminate 2 in which the cathode, the solid electrolyte layer and the anode were stacked in this order. At that time, the cathode layer was disposed on the solid electrolyte layer for the facing portion to ensure that, when the resulting laminate 2 was viewed from above, the periphery of the cathode layer was on the inside of the periphery of the solid electrolyte layer.

Then, the laminate 2 was hermetically wrapped in an aluminum laminate film with a terminal, thereby obtaining an all-solid-state battery 2.

Comparative Example 1

An all-solid-state battery 3 was obtained in the same manner as Example 1, except for the following: in [Production of all-solid-state battery], the cathode, the solid electrolyte layer and the anode were stacked and pressed at a press pressure of 1 ton/cm to obtain the laminate 1, and the laminate 1 was hermetically wrapped in the aluminum laminate film with the terminal, without forming the binder concentrated region in the laminate 1.

Comparative Example 2

A solid electrolyte layer was produced in the same manner as Example 1, except for the following: in [Production of solid electrolyte layer], the Li$_3$PS$_4$ (serving as the sulfide-based solid electrolyte) and the butylene rubber-based binder were weighed in a mass ratio of 95:5. An all-solid-state battery 4 was obtained in the same manner as Example 1, except for the following: in [Production of all-solid-state battery], the cathode, the solid electrolyte layer and the anode were stacked and pressed at a press pressure of 1 ton/cm to obtain the laminate 1, and the laminate 1 was hermetically wrapped in the aluminum laminate film with the terminal, without forming the binder concentrated region in the laminate 1.

Comparative Example 3

A solid electrolyte layer was produced in the same manner as Example 1, except for the following: in [Production of solid electrolyte layer], the $Li_3PS_4$ (serving as the sulfide-based solid electrolyte) and the butylene rubber-based binder were weighed in a mass ratio of 93:7. An all-solid-state battery 5 was obtained in the same manner as Example 1, except for the following: in [Production of all-solid-state battery], the cathode, the solid electrolyte layer and the anode were stacked and pressed at a press pressure of 1 ton/cm to obtain the laminate 1, and the laminate 1 was hermetically wrapped in the aluminum laminate film with the terminal, without forming the binder concentrated region in the laminate 1.

[Battery Resistance Measurement]

The all-solid-state batteries 1 to 5 were each charged and discharged in the following condition.

First, each all-solid-state battery was charged with constant current and constant voltage (CCCV) to a voltage of 2.9 V at a rate of C/3. Next, the all-solid-state battery was paused for 10 minutes and then discharged with CCCV to a voltage of 1.5 V at a rate of C/3. Next, the all-solid-state battery was paused for 10 minutes and then charged with CCCV to a voltage of 2.5 V at a rate of C/3. Next, the all-solid-state battery was paused for 10 minutes.

Next, the all-solid-state battery was discharged with constant current (CC) at a rate of 3C. Finally, the resistance of the all-solid-state battery was calculated from the voltage at the time of initiating the discharge and the voltage 10 seconds after initiating the discharge. The results are shown in Table 1.

[Peelability Examination]

The all-solid-state batteries 1 to 5 were each subjected to a vibration test.

The vibration test was carried out according to the conditions of the UN3480 T3 vibration test.

After the vibration test, each all-solid-state battery was visually observed to check the presence or absence of peeling-off of the non-cathode layer-facing portion of the solid electrolyte layer. The results are shown in Table 1.

TABLE 1

| | Binder amount (mass %) of the solid electrolyte layer | | Binder concentrated region in the non-facing portion of the solid electrolyte layer | Battery resistance (Ω) | Peeling-off of the non-facing portion after the vibration test |
|---|---|---|---|---|---|
| | Facing portion | Non-facing portion | | | |
| Example 1 | 1 | 5 | Present | 20.4 | Absent |
| Example 2 | 1 | 5 | Absent | 20.8 | Absent |
| Comparative Example 1 | 1 | 1 | Absent | 20.1 | Present |
| Comparative Example 2 | 5 | 5 | Absent | 24.5 | Present |
| Comparative Example 3 | 7 | 7 | Absent | 26.3 | Absent |

From a comparison between Examples 1 and 2 and Comparative Examples 1 to 3, the following was proved: by increasing the binder content of the non-cathode layer-facing portion of the solid electrolyte layer larger than the binder content of the cathode layer-facing portion of the solid electrolyte layer, peeling-off and cracking of the non-facing portion of the solid electrolyte layer are suppressed, while suppressing an increase in the resistance of the all-solid-state battery.

From a comparison between Examples 1 and 2 that have the same binder content of the non-facing portion, it was proved that the resistance of the all-solid-state battery is further decreased by forming the binder concentrated region.

REFERENCE SIGNS LIST

10. Plane direction
11. Solid electrolyte layer
12. Cathode layer
13. Anode layer
14. Cathode current collector
15. Anode current collector
16. Cathode
17. Anode
21. Non-facing portion
22. Facing portion
23. Second non-facing portion
24. Second facing portion
31. First region (binder concentrated region)
32. Second region
50. Laminating direction
100. All-solid-state battery
200. All-solid-state battery
300. All-solid-state battery
L. Thickness of non-cathode layer-facing portion of solid electrolyte layer

The invention claimed is:

1. An all-solid-state battery comprising:
   a cathode comprising a cathode layer,
   an anode comprising an anode layer, and
   a solid electrolyte layer disposed between the cathode layer and the anode layer,
   wherein a width of the cathode layer is smaller than a width of the anode layer and a width of the solid electrolyte layer;
   wherein the solid electrolyte layer comprises a first non-facing portion where the solid electrolyte layer does not face the cathode layer and a first facing portion where the solid electrolyte layer faces the cathode layer;
   wherein a binder content of the first non-facing portion is larger than a binder content of the first facing portion;
   wherein, for a thickness of the first non-facing portion, when a cathode layer-side surface of the non-facing portion is determined as 0, and an anode layer-side surface thereof is determined as 1, and
   when the first non-facing portion is divided into two vertically to thickness direction, at a position of 0.1 from the cathode layer-side surface of the first non-facing portion toward the anode layer-side surface thereof, and the cathode layer side and the anode layer side are determined as a first region and a second region, respectively,
   the first non-facing portion comprises a binder concentrated region where a binder content of the first region is larger than a binder content of the second region;
   wherein the width of the anode layer is larger than the width of the solid electrolyte layer;
   wherein the anode layer comprises a second non-facing portion where the anode layer does not face the solid electrolyte layer and a second facing portion where the anode layer faces the solid electrolyte layer;
   wherein a binder content of the second non-facing portion is larger than a binder content of the second facing portion; and
   wherein, for the thickness of the second non-facing portion, when the solid electrolyte layer-side surface of the second non-facing portion is determined as 0, and the anode current collector-side surface thereof is determined as 1, and when the second non-facing portion is divided into two vertically to thickness direction, at a position of 0.1 from the solid electrolyte-side surface of the second non-facing portion toward the anode current collector-side surface thereof, and the solid electrolyte layer side and the anode current collector side are determined as the third region and the fourth region, respectively, the second non-facing portion comprises a second binder concentrated region where a binder content of the third region is larger than a binder content of the fourth region.

* * * * *